United States Patent
Nozaki et al.

(10) Patent No.: US 7,685,777 B2
(45) Date of Patent: Mar. 30, 2010

(54) WEATHER STRIP FOR MOTOR VEHICLE

(75) Inventors: Masahiro Nozaki, Aichi-ken (JP); Kiyotaka Tamaoki, Aichi-ken (JP)

(73) Assignee: Toyoda Gosei Co., Ltd., Nishikasugai-gun (JP)

( * ) Notice: Subject to any disclaimer, the term of this patent is extended or adjusted under 35 U.S.C. 154(b) by 0 days.

(21) Appl. No.: 11/978,729

(22) Filed: Oct. 30, 2007

(65) Prior Publication Data

US 2008/0148646 A1 Jun. 26, 2008

(30) Foreign Application Priority Data

Nov. 28, 2006 (JP) ............................. 2006-320398

(51) Int. Cl.
*E06B 7/22* (2006.01)

(52) U.S. Cl. .................... 49/498.1; 49/490.1

(58) Field of Classification Search ............... 49/490.1, 49/498.1, 475.1; 296/146.9
See application file for complete search history.

(56) References Cited

U.S. PATENT DOCUMENTS

| | | | | | |
|---|---|---|---|---|---|
| 3,159,886 | A | * | 12/1964 | Lynch | 49/479.1 |
| 4,143,497 | A | * | 3/1979 | Offenbacher | 52/204.597 |
| 4,381,115 | A | * | 4/1983 | Ko | 49/498.1 |
| 4,474,402 | A | * | 10/1984 | Shelton | 296/76 |
| 4,617,220 | A | * | 10/1986 | Ginster | 428/122 |
| 4,769,950 | A | * | 9/1988 | Ogawa et al. | 49/490.1 |
| 4,813,184 | A | * | 3/1989 | Weimar | 49/477.1 |
| 4,819,382 | A | * | 4/1989 | Suzuki et al. | 49/490.1 |
| 4,952,442 | A | * | 8/1990 | Warner | 428/83 |
| 4,970,102 | A | * | 11/1990 | Guillon | 428/122 |
| 5,423,147 | A | * | 6/1995 | Dupuy | 49/490.1 |
| 5,613,326 | A | * | 3/1997 | Inoue et al. | 49/476.1 |
| 5,626,383 | A | * | 5/1997 | Lee et al. | 296/146.9 |
| 5,752,345 | A | * | 5/1998 | Bright et al. | 49/490.1 |
| 6,684,574 | B2 | * | 2/2004 | Hayashi | 49/490.1 |
| 6,848,217 | B2 | * | 2/2005 | Hashimoto et al. | 49/490.1 |
| 6,972,140 | B2 | * | 12/2005 | Watanabe | 428/36.9 |
| 7,281,354 | B2 | * | 10/2007 | Nishihara | 49/498.1 |

FOREIGN PATENT DOCUMENTS

| | | |
|---|---|---|
| JP | 4-37800 | 9/1992 |
| JP | 10-203167 | 8/1998 |

* cited by examiner

*Primary Examiner*—Katherine W Mitchell
*Assistant Examiner*—Michael J. Keller
(74) *Attorney, Agent, or Firm*—McGinn IP Law Group PLLC

(57) ABSTRACT

A weather strip exhibiting excellent sealing properties, of which a tubular seal portion is prevented from readily tilting when attached to a curved flange in a vehicle body. The weather strip includes a trim portion having a generally U-shaped cross-section and a tubular seal portion. The tubular seal portion includes a first outer seal wall, a second outer seal wall, a first inner seal wall, a second inner seal wall, an outer flexing part and an inner flexing part. The thickness of the tubular seal portion decreases in the order of joint areas of the first outer seal wall and the first inner seal wall to the trim portion, the second outer seal wall and the second inner seal wall, and the outer flexing part and the inner flexing part.

3 Claims, 3 Drawing Sheets

WEATHER STRIP FOR MOTOR VEHICLE

CROSS-REFERENCE TO RELATED APPLICATION

This application is related to and claims priority from Japanese patent application No. 2006-320398, incorporated herein by reference.

BACKGROUND OF THE INVENTION

1. Field of the Invention

The present invention relates to a weather strip for attachment to a flange provided in an opening surface around an opening in a body of a motor vehicle.

2. Description of Related Art

A motor vehicle has openings such as door openings, a trunk room openings, etc., and weather strips are attached to opening surfaces around these openings to effect seals between the opening surfaces and closing members for closing the openings, such as doors, trunk lids, etc.

Upon attaching of these weather strips to the opening surfaces, normally, flanges provided in the opening surfaces are inserted in interior spaces of trim portions of the weather strips.

For example, in order to seal around an opening of a rear trunk of a motor vehicle, as shown in FIG. 1, a weather strip 10 is attached to a flange 12 projecting from an end edge of an opening surface 14 of a vehicle body so as to face a periphery of a trunk lid 16 of the rear trunk.

The weather strip 10 has a trim portion 18 for attachment to the flange 12, and a tubular seal portion 20 for contacting and sealing a rear face of the trunk lid 16.

The trim portion 18 includes an outer side wall 22, an inner side wall 24 and a bottom wall 26, and has a generally U-shaped cross-section. Outer flange holding lips 28 and 30 and inner flange holding lips 32 and 34 respectively project obliquely from interior faces of the outer side wall 22 and the inner side wall 24 towards the bottom wall 26 in an interior space of the U-shaped trim portion 18. An insert of a metal plate is embedded in the trim portion 18.

Upon attaching of the weather strip 10 to the flange 12, a projecting end of the flange 12 provided around the opening of the rear trunk is inserted in the interior space of the trim portion 18. As described above, the trim portion 18 has the outer flange holding lips 28 and 30 and the inner flange holding lips 32 and 34, and these flange holding lips 28, 30, 32 and 34 hold and seal the flange 12, thereby retaining the posture of the weather strip 10 and preventing the weather strip 10 from coming off the flange 12. At this time, the tubular seal portion 20 contacts and seals the rear face of the trunk lid 16.

And a gap between the opening surface 14 and the weather strip 10 is sealed with a body seal lip 36 projecting from an exterior face of the outer side wall 22 of the trim portion 18 to contact the opening surface 14.

The opening surface 14 has curved parts according to the configuration of a vehicle body 38, and the flange 12 has curved areas, too.

Where the trim portion 18 is attached to the curved areas of the flange 12, the tubular seal portion 20 may unfavorably collapse or tilt, and consequently, the tubular seal portion 20 cannot contact the rear face of the trunk lid 16 in position, whereby the seal between the weather strip 10 and the trunk lid 16 may become insufficient.

In addition, the body seal lip 36 may not closely contact the opening surface 14 to form a gap therebetween.

Under these circumstances, in a weather strip 40 including a trim portion 42 and a tubular seal portion 44, as shown in FIG. 2, there has been disclosed the technique of making a lower part 46 of an outer seal wall 48 of the tubular seal portion 44 thickest while making an upper part 50 thereof thinnest (See Unexamined Japanese Patent application publication No. Hei 10-203167, for example). In this case, the thickness of the outer seal wall 48 varies, but the thickness of an inner seal wall 52 does not vary so that tilting of the tubular seal portion 44 cannot be sufficiently prevented.

And, in a weather strip 54 for a wind shield glass, as shown in FIG. 3, there has been proposed to make a top lip 56 projecting from a lozenge-shaped tubular seal portion 58 thickest while making one L-shaped seal wall 60 of the tubular seal portion 58 thinner than the top lip 56 but thicker than the other L-shaped seal wall 62 (See Japanese Utility model publication No. Hei 4-37800, for example).

In this case, the thickness of the tubular seal portion 58 is varied for maintaining the load of the weather strip 54 against the wind shield glass, but, where the weather strip 54 is attached to corner areas of a vehicle body, undesirable tilting of the tubular seal portion 58 of the weather strip 54 has not been prevented.

SUMMARY OF THE INVENTION

Accordingly, it is an object of the present invention to provide a weather strip of which a tubular seal portion is difficult to tilt when attached to curved areas of a flange of a vehicle body, and exhibits excellent sealing properties.

In accordance with a first aspect of the present invention, a weather strip for a motor vehicle, which is to be attached to a flange around an opening in a vehicle body for sealing an opening surface of the vehicle body against a facing member, includes a trim portion for attachment to the flange and holding the weather strip, and a tubular seal portion integrally formed with the trim portion for contacting the facing member and effecting a seal between the opening surface and the facing member. The tubular seal portion includes an outer seal wall which extends from an outer end of an upper part of the trim portion and is composed of a first outer seal wall and a second outer seal wall, and an inner seal wall which extends from an inner end of the upper part of the trim portion and is composed of a first inner seal wall and a second inner seal wall, an end of the second outer seal wall and an end of the second inner seal wall are jointed to each other, a joint of the first outer seal wall and the second outer seal wall defines an outer flexing part, a joint of the first inner seal wall and the second inner seal wall defines an inner flexing part, and the outer seal wall has a thickness which is the greatest in a joint area of the first outer seal wall to the trim portion, and gradually decreases in the order of the second outer seal wall and the outer flexing part, whereas the inner seal wall has a thickness which is the greatest in a joint area of the first inner seal wall to the trim portion, and gradually decreases in the order of the second inner seal wall and the inner flexing part.

With this arrangement, the weather strip includes a trim portion to be attached to the flange, and a tubular seal portion integrally formed with the trim portion for contacting the facing member and effecting a seal between the opening surface and the facing member so that when the trim portion is attached to the flange, the weather strip can be held and secured to the vehicle body. And the trim portion attached to the flange retains the posture of the weather strip without tilting downwardly, and consequently, the tubular seal portion securely contacts the facing member to provide a seal between the opening surface and the facing member.

The tubular seal portion has an outer seal wall which extends from an outer end of an upper part of the trim portion and is composed of a first outer seal wall and a second outer seal wall, and an inner seal wall which extends from an inner end of the upper part of the trim portion and is composed of a first inner seal wall and a second inner seal wall. With this arrangement, these four seal walls can define an integral tubular seal portion on an exterior face of the trim portion, thereby providing a secure seal between the opening surface and the facing member.

An end of the second outer seal wall and an end of the second inner seal wall are jointed to each other, a joint of the first outer seal wall and the second outer seal wall defines an outer flexing part, and a joint of the first inner seal wall and the second inner seal wall defines an inner flexing part. With this arrangement, when an opening is closed with a closing member as the facing member, the tubular seal portion securely flexes in both the outer flexing part and the inner flexing part, and a jointed end of the tubular seal portion contacts the closing member to securely seal the same.

The outer seal wall of the tubular seal portion has a thickness which is the greatest in the first outer seal wall on the side of the trim portion, and gradually decreases in the order of the second outer seal wall and the outer flexing part, whereas the inner seal wall of the tubular seal portion has a thickness which is the greatest in the first inner seal wall on the side of the trim portion, and gradually decreases in the order of the second inner seal wall and the inner flexing part. With this arrangement, when the opening is closed with the closing member, the tubular seal portion easily flexes, and consequently, the jointed end of the tubular seal portion contacts the closing member to provide a secure seal thereagainst, and the load of the jointed end of the tubular seal portion is decreased to reduce the closing force of the closing member.

In accordance with a second aspect of the present invention, a top lip is further provided in a joint of the end of the second outer seal wall and the end of the second inner seal wall so as to shift outwardly of a center line of the trim portion.

With this arrangement, since the top lip is provided in the joint of the end of the second outer seal wall and the end of the second inner seal wall so that when the opening is closed with the closing member, an end of the top lip contacts the closing member to provide a linearly extending seal, thereby providing a secure seal thereagainst. The top lip is formed so as to shift outwardly of the center line of the trim portion so that when the weather strip is attached to curved areas of the opening surface, the tubular seal portion is prevented from tilting inwardly and consequently, the top lip contacts the closing member to secure sealing properties.

In accordance with a third aspect of the present invention, the outer flexing part is located near the trim portion, as compared to the inner flexing part.

With this arrangement, the outer flexing part is located near the trim portion, as compared to the inner flexing part so that when the opening is closed with the closing member and the tubular seal portion is pushed from the upper side thereof, the tubular seal portion leans outwardly and the top lip contacts the closing member to ensure the sealing properties. In addition, when the weather strip is attached to the curved areas of the opening surface, the tubular seal portion flexes in the outer flexing part and leans outwardly to ensure the sealing properties.

In a fourth aspect of the present invention, the second inner seal wall has a thickness greater than that of the second outer seal wall.

With this arrangement, the second inner seal wall has a thickness greater than that of the second outer seal wall so that when the opening is closed with the closing member and the tubular seal portion is pushed from the upper side thereof, or when the weather strip is attached to the curved areas of the opening surface, the tubular seal portion maintains desirable sealing properties without tilting inwardly.

In accordance with a fifth aspect of the present invention, a pad with good flexibility is inserted in a part of the tubular seal portion, which is to be attached to a curved area of the flange in the vehicle body.

With this arrangement, the pad with good flexibility is inserted in the part of the tubular seal portion, which is to be attached to the curved area of the flange, so that when the weather strip is attached to the curved area of the flange, the tubular seal portion can maintain a tubular configuration without collapsing so as to ensure the sealing properties.

In accordance with a sixth aspect of the present invention, the tubular seal portion is composed of a sponge rubber, and the trim portion is composed of a solid rubber.

With this arrangement, since the tubular seal portion is composed of the sponge rubber, it can flexibly contact irregularities and curved faces of the closing member, thereby providing a seal thereagainst, and since the trim portion is composed of the solid rubber, it can be strongly and securely attached to the flange.

In accordance with a seventh aspect of the present invention, the joint areas where the first outer seal wall and the first inner seal wall are jointed to the trim portion are composed of a solid rubber.

With this arrangement, since the joint areas where the first outer seal wall and the first inner seal wall are jointed to the trim portion are composed of a solid rubber, deformations of the joint areas are prevented, thereby preventing abnormal deformations of the tubular seal portion to ensure sealing properties.

In accordance with an eighth aspect of the present invention, the trim portion has a generally U-shaped cross-section, an insert is embedded in the trim portion, and interior faces of the trim portion have flange holding lips.

With this arrangement, since the trim portion has a generally U-shaped cross-section, an insert is embedded in the trim portion and interior faces of the trim portion have flange holding lips, the rigidity of the entire trim portion is improved and the trim portion can strongly hold the flange, whereby the attaching position of the tubular seal portion can be made stable to ensure the sealing properties.

In addition, the flange is inserted in an interior space of the trim portion with a generally U-shaped cross-section, and side faces of the flange are stably held with the outer flange holding lips and the inner flange holding lips, and consequently, the weather strip can be attached to the flange with the trim portion exhibiting rigidity and having a generally U-shaped cross-section.

In accordance with a ninth aspect of the present invention, the weather strip is composed of an EPDM rubber or a thermoplastic olefin elastomer.

With this arrangement, since the weather strip is composed of an EPDM rubber or a thermoplastic olefin elastomer, the co-extrusion can be performed using the same kind of material and consequently, the weather strip exhibiting a good weather resistance can be obtained where both the sponge material and the solid material are composed of the EPDM rubber or the thermoplastic olefin elastomer. In addition, since these materials are an olefin resin and an olefin rubber, the weather strip can be recycled without subjected to any separating process, whereby readily recyclable weather strips can be obtained.

In accordance with a tenth aspect of the present invention, the weather strip is a trunk weather strip or a back door weather strip.

With this arrangement, the closing member is a door, the weather strip is a trunk weather strip or a back door weather strip so that rainwater, dust, etc. intruding between a trunk and a trunk lid, or between the opening surface and a back door can be securely sealed, and noise intruding into a vehicle compartment can be securely prevented.

In accordance with the present invention, the outer flexing part and the inner flexing part are formed in the seal wall defining the tubular seal portion so that when the opening is closed with the closing member, the tubular seal portion securely flexes in these flexing parts to prevent abnormal deformations thereof.

The seal wall of the tubular seal portion has a thickness which gradually decreases in the order of the joint area of the first outer seal wall to the trim portion, the second outer seal wall and the outer flexing part and in the order of the joint area of the first inner seal wall to the trim portion, the second inner seal wall and the inner flexing part so that when the opening is closed with the closing member, the tubular seal portion easily flexes, and consequently, the upper end of the tubular seal portion contacts the closing member to provide a secure seal thereagainst and reduce the load of the end of the tubular seal portion, thereby decreasing the closing force of the closing member.

Other objects, features, and characteristics of the present invention will become apparent upon consideration of the following description and the appended claims with reference to the accompanying drawings, all of which form a part of this specification.

DETAILED DESCRIPTION OF THE PREFERRED EMBODIMENTS

Hereinafter, one embodiment of the present invention will be explained with reference to FIG. 4 through FIG. 6.

Figure 1:
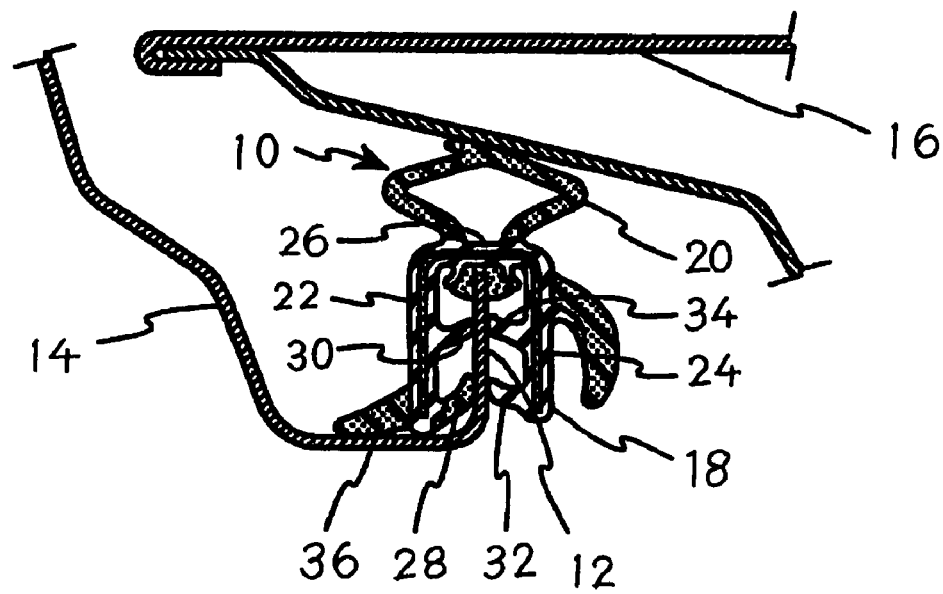
FIG. 1 is a cross-sectional view of one example of a conventional weather strip.
Figure 2:
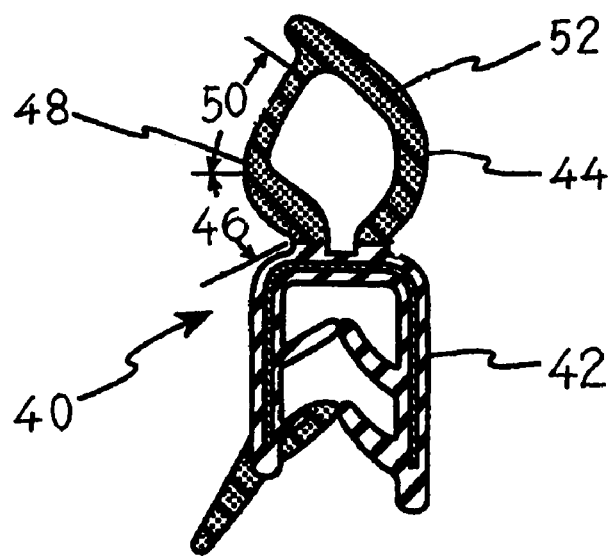
FIG. 2 is a cross-sectional view of another example of a conventional weather strip.
Figure 3:
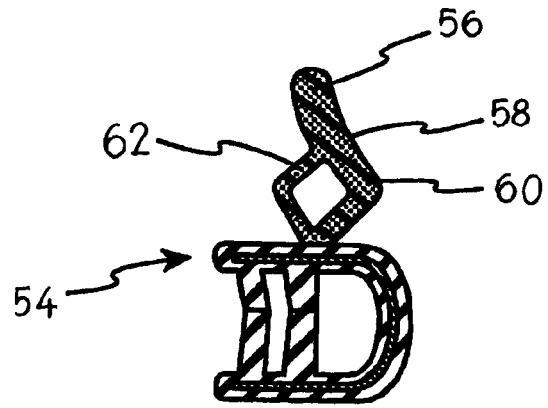
FIG. 3 is a cross-sectional view of still another example of a conventional weather strip.
Figure 4:
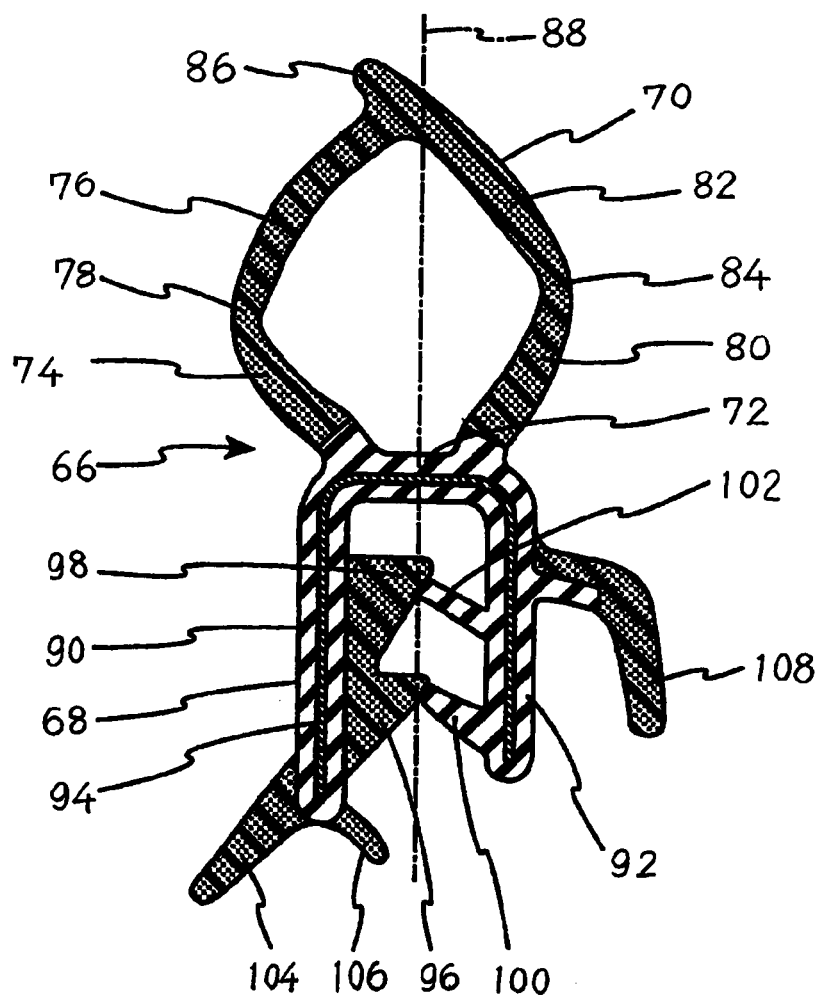
FIG. 4 shows one embodiment of a weather strip in accordance with the present invention, and is a cross-sectional view thereof.

FIG. 4 is a cross-sectional view of a weather strip 66 prior to attachment to a vehicle body. FIG. 5 shows the weather strip 66 attached to a rear trunk in a closing state of a trunk lid 16, and is a cross-sectional view taken along line A-A of FIG. 6. FIG. 6 is a schematic perspective view seen from an obliquely front and upper side of a vehicle body, and shows the relation between an opening surface 14 and the trunk lid 16 in the rear trunk.

The present embodiment will be explained with reference to the weather strip 66 to be attached to the rear trunk. The present invention can be also applied to a back door weather strip and other weather strips adapted to seal openings formed in a vehicle body, such as door openings, roof openings, etc.

As shown in FIG. 4, the weather strip 66 has a trim portion 68 for attachment to the flange 12 and a tubular seal portion 70 for contacting and sealing the trunk lid 16.

The tubular seal portion 70 is integrally formed on an exterior face of a bottom wall 72 of the trim portion 68 so as to project upwardly. The tubular seal portion 70 has a generally lozenge-shaped cross-section, and is composed of a sponge material.

An outer seal wall of the tubular seal portion 70 includes a first outer seal wall 74 extending from an outer end of the bottom wall 72 of the trim portion 68, and a second outer seal wall 76 extending from the first outer seal wall 74 in an opposite direction to the extending direction of the first outer seal wall 74.

A joint of the first outer seal wall 74 and the second outer seal wall 76 is formed to have a decreased thickness and curves into an L-shaped configuration, thereby defining an outer flexing part 78.

An inner seal wall of the tubular seal portion 70 includes a first inner seal wall 80 extending from an inner end of the bottom wall 72 of the trim portion 68, and a second inner seal wall 82 extending from the first inner seal wall 80 in an opposite direction to the extending direction of the first inner seal wall 80.

A joint of the first inner seal wall 80 and the second inner seal wall 82 is formed to have a decreased thickness, and curves into an L-shaped configuration, thereby defining an inner flexing part 84.

The thickness of the first outer seal wall 74 is similar to that of the first inner seal wall 80. And the thickness of each of these walls 74 and 80 is the greatest in a part adjacent to the bottom wall 72, that is a root thereof, and the thickness of a remaining part of each of these walls 74 and 80 is approximately constant or gradually decreases toward each of the flexing parts 78 and 84. Namely, the thickness of the tubular seal portion 70 is smallest in the outer flexing part 78 and the inner flexing part 84.

The thickness of each of the second outer seal wall 76 and the second inner seal wall 82 increases by a small distance from each of the outer flexing part 78 and the inner flexing part 84, and then becomes approximately constant to a top of the tubular seal portion 70.

Namely, an end of the second outer seal wall 76 and an end of the second inner seal wall 82 are jointed to each other to define the top of the tubular seal portion 70 with a lozenge-shaped cross-section. A top lip 86 is formed on an exterior face of the top of the tubular seal portion 70 so as to extend obliquely and outwardly. The top lip 86 is formed so as to shift outwardly of a center line 88 of the trim portion 68.

Accordingly, the thickness of the tubular seal portion 70 decreases in the order of the roots of the first outer and inner seal walls 74, 80, that are adjacent to the trim portion 68, the second outer and inner seal walls 76, 82, and the outer and inner flexing parts 78, 84.

The roots of the first outer and inner seal walls 74, 80, that are adjacent to the trim portion 68, are composed of a solid rubber similar to that of the trim portion 68, and are integrally and continuously formed therewith.

Figure 5:
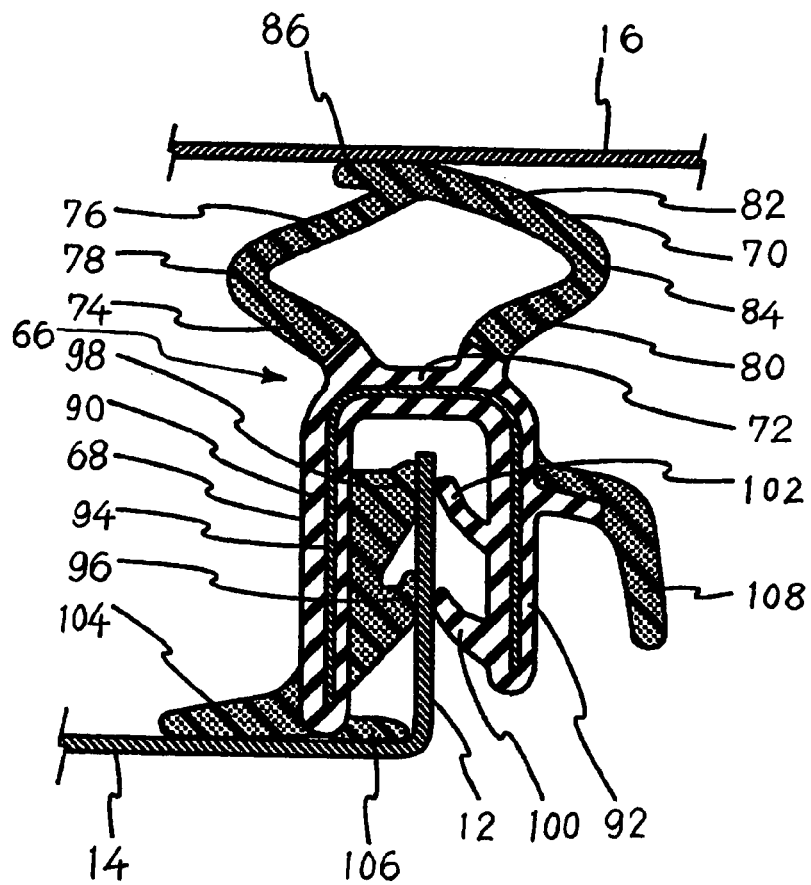
FIG. 5 shows one embodiment of a weather strip in accordance with the present invention, and is a cross-sectional view in an attaching state thereof to a vehicle body, taken along line A-A of FIG. 6.
Figure 6:
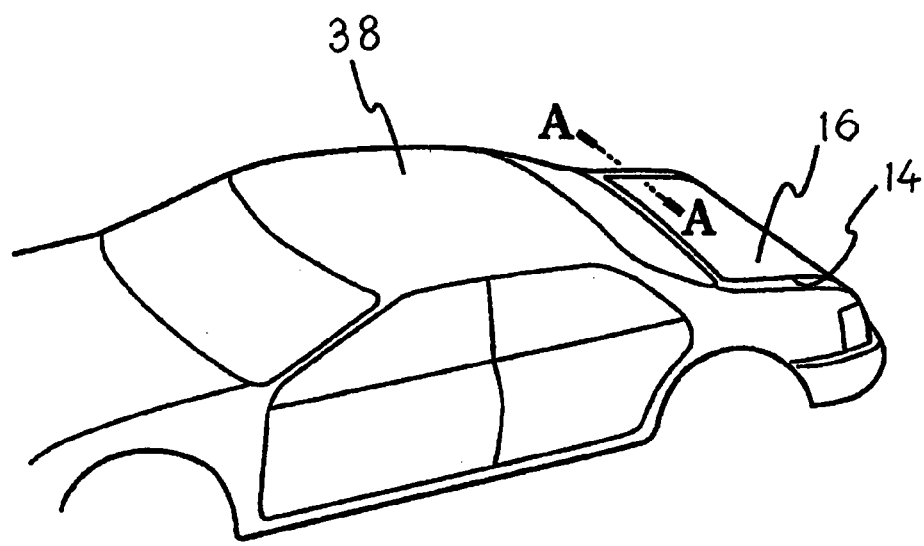
FIG. 6 is a schematic perspective view of a motor vehicle when seen from an obliquely front and upper side thereof.

With this arrangement, as shown in FIG. 5, when a trunk room opening is closed with the trunk lid 16 as the closing member, the tubular seal portion 70 flexes in the outer and inner flexing parts 78, 84 so as not to cause abnormal deformations such as the tilting toward the outer side of the vehicle body. In addition, since the roots of the first outer and inner seal walls 74, 80, that are adjacent to the trim portion 68, have a greatest thickness, and the joint areas to the trim portion 68 are composed of a solid rubber, the roots of the tubular seal portion 70 become stable, and the configuration thereof can be held with an upper part of the bottom wall 72 of the trim portion 68. Where the weather strip 66 is attached in a curving state, there do not occur abnormal deformations such as collapse of the tubular seal portion 70.

In addition, where the thickness of the second inner seal wall 82 is made slightly greater than that of the second outer seal wall 76, the tubular seal portion 70 readily flexes toward the outer side of the vehicle body, and, as shown in FIG. 5, a projecting end of the top lip 86 of the tubular seal portion 70 contacts the rear face of the trunk lid 16 to prevent the tubular seal portion 70 from tilting toward the inner side of the vehicle body, thereby effecting a secure seal.

And the outer flexing part 78 is provided near the bottom wall 72 of the trim portion 68, as compared to the inner flexing part 84. Namely, in FIG. 4, the outer flexing part 78 is located downwardly of the inner flexing part 84. Accordingly, as shown in FIG. 5, when the trunk lid 16 is in a closed position to push the tubular seal portion 70 from the upper side thereof, the tubular seal portion 70 flexes obliquely toward the outer side of the vehicle body, and an upper part of the top lip 86 contacts the trunk lid 16, whereby the projecting end of the top lip 86 linearly contacts the trunk lid 16 with preferable sealing properties.

In case of the tubular seal portion 70 being composed of a sponge material, the tubular seal portion 70 exhibits great flexibility so that when the tubular seal portion 70 contacts the trunk lid 16, the tubular seal portion 70 deforms according to the configuration of the trunk lid 16, whereby the end thereof can securely contact the trunk lid 16 with high sealing properties.

The tubular seal portion 70 can be formed on an exterior face of an outer side wall 90 or an inner side wall 92 of the trim portion 68 according to the attaching position of the weather strip 66.

A pad with good flexibility may be inserted in a part of the tubular seal portion, which is to be attached to a curved area of the flange in the vehicle body. With this arrangement, the pad with good flexibility inserted in the tubular seal portion serves to maintain a tubular configuration of the tubular seal portion without collapsing so as to ensure the sealing properties thereof when attached to the curved area of the flange in the vehicle body.

Hereinafter, the trim portion 68 will be explained.

The trim portion 68 includes the outer side wall 90, the inner side wall 92 and the bottom wall 72, and has a generally U-shaped cross-section. The outer side wall 90, the inner side wall 92 and the bottom wall 72 can be composed of a solid rubber or a finely foamed solid rubber. In order to strengthen a holding force of the trim portion 68 against the flange 12, an insert 94 composed of fish-bone shaped metal elements is embedded in the outer side wall 90, the inner side wall 92 and the bottom wall 72. The insert 94 may be composed of a hard member of a hard synthetic resin, etc. in place of metal, and a series of fish-bone shaped metal elements may be used. Where the outer side wall 90, the inner side wall 92 and the bottom wall 72 are composed of a hard rubber, etc., the insert 94 can be omitted. The trim portion 68 may have only the outer side wall 90 and the bottom wall 72 to define a generally L-shaped cross-section. In this case, the trim portion 68 may be attached to the vehicle body with a double-sided adhesive tape that is bonded to an interior face of the outer side wall 90.

A first outer flange holding lip 96 and a second outer flange holding lip 98 respectively extend from the interior face of the outer side wall 90 obliquely and upwardly into an interior space of the U-shaped trim portion 68, similarly to the conventional flange holding lips, whereas a first inner flange holding lip 100 and a second inner flange holding lip 102 similarly extend obliquely from the interior face of the inner side wall 92 into the interior space of the U-shaped trim portion 62. When the weather strip 66 is attached to the flange 12 of the vehicle body, the first outer flange holding lip 96, the second outer flange holding lip 98, the first inner flange holding lip 100 and the second inner flange holding lip 102 can stably hold the flange 12.

The first outer flange holding lip 96 and the second outer flange holding lip 98 are formed to extend obliquely so as to contact tip ends of the first inner flange holding lip 100 and the second inner flange holding lip 102, respectively. When the flange 12 is inserted in the trim portion 68, side faces of the flange 12 are supported with these flange holding lips, and consequently, the trim portion 68 is attached to the flange 12.

In addition, the first outer flange holding lip 96 and the second outer flange holding lip 98 are composed of a sponge material with a great thickness, whereas the first inner flange holding lip 100 and the second inner flange holding lip 102 are composed of a solid rubber with a lip-shaped configuration.

Since the first outer flange holding lip 96 and the second outer flange holding lip 98 are composed of the sponge material, they can flexibly deform conforming to the configuration of the flange 12 upon attaching of the trim portion 68 to the flange 12 even where there are irregularities due to spot-welding, and variations in the number of metal panels composing the flange 12, whereby these lips can continuously contact the flange 12 closely to maintain good sealing properties, the flange 12 can be readily inserted between these lips, and the friction force against the flange 12 is great so that the trim portion 68 does not readily come off the flange 12.

The first inner flange holding lip 100 and the second inner flange holding lip 102 can be composed of a solid material or a finely foamed material. In case of the solid material or the finely foamed material, lips 100 and 102 exhibit higher rigidity, as compared to the case of the sponge material, and consequently, these lips turn about roots thereof and leans toward the inner side wall 92 without buckling in middles of these lips, thereby securely holding an upper side of the flange 12. Since the second inner flange holding lip 102 contacts the flange 12 on the side of a projecting end thereof, the second inner flange holding lip 102 contacts the flange 12 in the final stage of the insertion step of the flange 12 so that the increment of the insertion load of the flange 12 is prevented.

In case of the finely foamed material, the entire weight of the weather strip can be reduced, thereby contributing to the production of lightweight weather strips while ensuring the minimum rigidity, thereby reducing the required amount of materials.

A body seal lip 104 projects obliquely and downwardly from an exterior face of an end of the outer side wall 90. The body seal lip 104 has a relatively great thickness which is approximately constant over the entire length thereof, and is composed of a sponge material. When the body seal lip 104 thus arranged contacts the opening surface 14, a projecting end thereof can linearly contact so that the pushing force of the body seal lip 104 is great, thereby improving the sealing properties. Therefore, the body seal lip 104 prevents intrusion of rainwater, dust, noise, etc. into a vehicle compartment via a gap between the flange 12 and the trim portion 68, thereby sealing the opening surface 14 around the body opening against the weather strip 72. In addition, where the body seal lip 104 is formed so as to concavely curve relative to the opening surface 14, the body seal lip 104 can deform conforming to irregularities or deformations in the opening surface 14, and consequently, an extending end of the body seal lip 104 elastically contacts the opening surface 14 to ensure sealing properties thereagainst.

A sub body seal lip 106 is formed so as to project obliquely and downwardly from an interior face of the end of the outer side wall 90. As shown in FIG. 4, the sub body seal lip 106 is formed into a curved configuration with a length and a thickness less than those of the body seal lip 104 and the first outer flange holding lip 96. Consequently, as shown in FIG. 5, when the weather strip 66 is attached to the flange 12, the sub body seal lip 106 curves and contacts a corner between a root of the flange 12 and the opening surface 14. Since the sub body seal lip 106 is formed thin, it can deform conforming to the configuration of the root of the flange 12 into close contact therewith, and consequently, even if rainwater, etc. pass through a gap between the body seal lip 104 and the opening surface 14, the sub body seal lip 106 can securely prevent intrusion thereof into the vehicle compartment, and can also seal noise, etc., thereby further improving the sealing properties of the weather strip 66.

Where the sub body seal lip 106 is composed of a sponge material, it exhibits improved flexibility, and consequently, flexes conforming to irregularities and deformations in the root of the flange 12, thereby ensuring good sealing properties.

A cover lip 108 is formed so as to project inwardly from an upper part of an exterior face of the inner side wall 92 and then downwardly curve. After the weather strip 66 is attached to the flange 12, the cover lip 108 is arranged so as to cover ends of a garnish (not shown), panels (not shown), etc. provided in the vehicle compartment, whereby gaps between the weather strip 66, the garnish, the panels, etc., are sealed and covered to improve the appearance therearound.

Where the cover lip 108 is composed of a sponge material, it exhibits improved flexibility, and consequently, flexes conforming to variations in the gaps between the weather strip, the garnish, the panels, etc., thereby ensuring good sealing properties.

When the trim portion 68 is attached to the flange 12, as described above, the first outer flange holding lip 96, the second outer flange holding lip 98, the first inner flange holding lip 100 and the second inner flange holding lip 102 hold the flange 12, whereby the posture of the weather strip 66 is stably maintained.

As a result, the tubular seal portion 70 integrally formed with the trim portion 68 securely contacts the rear face of the trunk lid 16 to seal a gap between the trunk lid 16 and the opening surface 14.

The sponge material used for forming the tubular seal portion 70, the first outer flange holding lip 96, the second outer flange holding lip 98, the body seal lip 104, etc. can be composed of a rubber foam with a specific gravity of 0.3 to 0.6. In this case, by virtue of the rubber foam with the specific gravity of 0.3 to 0.6, the elasticity and the flexibility are improved so that good sealing properties can be ensured where used over a long period of time.

In accordance with the present invention, the weather strip 66 is formed using a synthetic rubber such as an EPDM rubber, etc., a thermoplastic elastomer such as a polyolefin elastomer, etc., and a soft synthetic resin such as a soft vinyl chloride, etc. Where EPDM rubber and thermoplastic olefin elastomer are used, co-extrusion can be performed using materials of the same kind, whereby products with good weather resistance can be obtained. And the obtained products can be recycled without subjected to any separation step, because of similar olefin resin and rubber, whereby readily recyclable products can be obtained.

Straight parts of the weather strip 66 are produced by extruding a material using an extruder, and then cutting the extruded material into predetermined lengths. Curved parts of the weather strip 66, which are to be attached along corners of the opening surface 14, may be formed by molding. In this case, the straight parts are simultaneously jointed to the curved parts by molding.

In case of synthetic rubber, after extruded, the extruded material is transferred to a vulcanizing chamber, and heated therein with hot wind and high frequency waves, etc. for vulcanization. In case of thermoplastic elastomer and soft synthetic resin, the extruded material is cooled for solidification.

While the invention has been described in connection with what are considered to be the preferred embodiments, it is to be understood that the invention is not limited to the disclosed embodiments, but, on the contrary, is intended to cover various modifications and equivalent arrangements included within the spirit and scope of the appended claims.

What is claimed is:

1. A weather strip for a motor vehicle, which is to be attached to a flange around an opening in a vehicle body for sealing an opening surface of the vehicle body against a facing member, comprising:
   a trim portion including an outer side wall, an inner side wall and a bottom wall for attachment to the flange and holding the weather strip; and
   a tubular seal portion integrally formed with said trim portion for contacting the facing member and effecting a seal between the opening surface and the facing member,
   wherein said tubular seal portion comprises:
      an outer seal wall which extends from an outer end of the bottom wall of said trim portion and comprises a first outer seal wall and a second outer seal wall; and
      an inner seal wall which extends from an inner end of the bottom wall of said trim portion and comprises a first inner seal wall and a second inner seal wall,
   wherein a distal end of said second outer seal wall and a distal end of said second inner seal wall being joined to each other, and said outer wall is formed in an L-shaped configuration and said inner wall is formed in an L-shaped configuration, said tubular seal portion having a substantially lozenge-shaped cross-section,
   wherein a joint of said first outer seal wall and said second outer seal wall defines an outer flexing part,
   wherein a joint of said first inner seal wall and said second inner seal wall defines an inner flexing part,
   wherein said outer seal wall has a thickness which is the greatest in a joint area of said first outer seal wall to said trim portion, and gradually decreases in the order of said second outer seal wall and said outer flexing part, and said inner seal wall has a thickness which is the greatest in a joint area of said first inner seal wall to said trim portion, and gradually decreases in the order of said second inner seal wall and said inner flexing part,
   wherein a thickness of the first outer seal wall is substantially the same as a thickness of the first inner seal wall, and a thickness of each of the first outer seal wall and the first inner seal wall is greatest in a part adjacent to the bottom wall that comprises a root thereof, and a thickness of a remaining part of each or the first outer seal wall and the first inner seal wall is approximately constant or gradually decreases toward each of the flexing parts, such that a thickness of the tubular seal portion in the outer flexing part and the inner flexing part is less than a thickness of a remaining portion of the tubular seal portion, wherein said weather strip comprises one of a trunk weather strip and a back door weather strip, and wherein said weather strip is composed of one of an ethylene propylene diene M-class rubber (EPDM rubber) and a thermoplastic olefin elastomer.

2. A weather strip for a motor vehicle as claimed in claim 1, wherein a pad with good flexibility is inserted in a part of said tubular seal portion, which is to be attached to a curved area of the flange in the vehicle body.

3. A weather strip as claimed in claim 1, wherein the substantially lozenge-shaped cross-section comprises a substantially rhombus shape with the four corners corresponding to the edge abutting the bottom wall, the joining location of the distal end of the second outer seal wall and the distal end of the second inner seal wall, the joint of the first outer seal wall and the second outer seal wall, and the joint of said first inner seal wall and said second inner seal wall.

* * * * *